United States Patent [19]

Schlafer

[11] 4,053,905

[45] Oct. 11, 1977

[54] OPTICAL SCANNING APPARATUS FOR PHOTOLITHOGRAPHY OF A COLOR CATHODE RAY TUBE HAVING AN APERTURE MASK

[75] Inventor: John Schlafer, Wayland, Mass.

[73] Assignee: GTE Laboratories Incorporated, Waltham, Mass.

[21] Appl. No.: 699,109

[22] Filed: June 23, 1976

[51] Int. Cl.[2] .................. G03B 41/00

[52] U.S. Cl. .................. 354/1; 96/36.1

[58] Field of Search .................. 354/1, 4, 5; 350/6, 350/7, 285; 355/8, 20, 84; 96/36.1; 427/43, 53, 54, 68

[56] References Cited

U.S. PATENT DOCUMENTS

| | | | |
|---|---|---|---|
| 3,876,425 | 4/1975 | Geenen et al. | 354/1 X |
| 3,985,439 | 10/1976 | Kiemle | 354/4 X |

*Primary Examiner*—John Gonzales
*Attorney, Agent, or Firm*—Irving M. Kriegsman; Leslie J. Hart

[57] ABSTRACT

In an optical scanning apparatus for photolithographic processing of faceplates intended for color cathode ray tubes, a light beam from a source is first deflected through an angle related to a predetermined angle of incidence that an electron beam in an operating tube has with respect to a defined faceplate location, and then the deflection point is imaged onto or in the vicinity of the faceplate. This angle of incidence adjustment is accomplished for each faceplate location as the light beam is scanned over the surface of the faceplate. The light source, which is preferably a laser light source, creates a light beam having a wavelength spectrum which exposes the photosensitive material. The beam is deflected by a pair of orthogonally aligned mirrors which are rotated by galvanometers. Each galvanometer is driven by a current from an electrical control, the current being related to the proper angle of incidence for each faceplate location. An optical focusing device images the point of deflection of the light beam substantially onto the faceplate. This image of the deflection source is then scanned over the surface of the faceplate in a predetermined pattern by a mirror which is rotated about a pair of orthogonal axes by motors which are controlled by the electrical control. By this arrangement, the photoresist on the faceplate is correctly exposed at the proper location to be in registration with the electrons landing on the faceplate after passing through the same mask apertures in the completed cathode ray tube.

41 Claims, 6 Drawing Figures

OPTICAL SCANNING APPARATUS FOR PHOTOLITHOGRAPHY OF A COLOR CATHODE RAY TUBE HAVING AN APERTURE MASK

CROSS-REFERENCE TO OTHER APPLICATIONS

A concurrently filed application entitled "Optical Scanning Apparatus And Method For Manufacturing Cathode Ray Tubes" bears Ser. No. 699,110 and is filed in the name of John Schlafer, G. Norman Williams and R. F. Wilson. Also, a concurrently filed application entitled "Control System For An Optical Scanning Exposure System For Manufacturing Cathode Ray Tubes" bears Ser. No. 699,045 and is filed in the name of Thomas W. Schultz. Further, a concurrently filed application entitled "Overlap And Overscan Exposure Control System" bears Ser. No. 699,054 and is filed in the name of Mahlon B. Fisher and G. Norman Williams. In addition, a concurrently filed patent application entitled "Exposure Area Control For An Optical Scanning System For Manufacturing Cathode Ray Tubes" bears Ser. No. 699,046 and is filed in the name of Thomas W. Schultz. Lastly, a concurrently filed application entitled "Scanning Rate And Intensity Control For Optical Scanning Apparatus" bears Ser. No. 699,047 and is filed in the name of Thomas W. Schultz.

BACKGROUND OF THE INVENTION

The present invention relates to a method of and apparatus for photolithographic processing of faceplates intended for color cathode ray tubes having an aperture mask, and more specifically, to exposing photosensitive material with a scanning light beam.

The exposure of this photosensitive material provides a means for delineating the pattern of other material applied to the faceplate for generating, filtering or blocking light or for other functions. In a typical method, phosphor is dusted onto the surface of the photosensitive material, after which the material is selectively exposed. Then, the unexposed photosensitive material is removed from the faceplate by well-known techniques. An important step in this method is the act of exposing the photosensitive material at the proper locations on the faceplate.

Non-scanning methods for exposure of photosensitive material on the inner surface of a faceplate of a cathode ray tube are known. In one known method, the photoresist, such as dichromated polyvinyl alcohol, is exposed by light from an ultraviolet light source, the light passing through an aperture mask registered with the faceplate. The ultraviolet source is a mercury arc lamp whose output is concentrated to pass through a small source aperture and then dispersed to fully illuminate the aperture mask. The proper intensity distribution, which is not necessarily uniform, across the aperture mask is obtained by controlling the intensity distribution at the source aperture and by the insertion of a graded neutral density filter between the source aperture and the aperture mask.

For proper registration of the phosphor pattern on the faceplate with the electron beam landings in the assembled tube, the light rays from the ultraviolet source during photoresist exposure should parallel the electron beam trajectories as they pass through the various apertures in the aperture mask. Due to aberrations in the magnetic deflection process, the apparent location of the electron beam source varies with the deflection angle. Thus, a fixed optical point source alone cannot simulate the deflected electron source over the entire faceplate. To introduce the necessary off-axis correction factors into the optical exposure system, a special aspheric lens is inserted into the system between the light source and aperture mask, with a separate lens being required for each of the three electron gun positions. The contour of each lens is designed such that the light source as seen through the lens from each point on the faceplate has the correct lateral location in the source plane to produce rays passing through the aperture mask with the same angle of incidence as an electron beam through the same aperture in an assembled tube. Design calculations for these lenses are difficult and costly, especially as maximum deflection angles become larger.

In most cases, when a tube design is modified by changing the maximum deflection angle, deflection yoke winding pattern or position, curvature, aperture mask spacing, or certain other parameters, a new lens set and graded neutral density filters are needed. Optimizing the new design may require a trial-and-error procedure which could involve the fabrication of additional lenses and filters.

Various scanning exposure systems are also known. In such a system, a small light beam is scanned over the aperture mask so as to expose the photosensitive material adjacent to the light-transmitting regions or apertures in the mask. For example, a scanning exposure system is described in the British Patent Specification No. 1,257,933. In this patent, a scanned laser beam is used in conjunction with an aperture mask and photosensitive material for delineating phosphor patterns on faceplates for color CRT's. However, this patent does not provide for correction of the inherent discrepancy between electron beam landings and phosphor locations.

Another scanning exposure system is described in the U.S. patent to Geenen et al., No. 3,876,425. In this system, the effective light beam source is actually translated about a source plane to provide correlation between phosphor locations and electron beam landing locations. Such beam translation eliminates the need for the aspheric lens which is necessary in the non-scanning exposure system. In the system described in the Geenen patent, the effective light beam source is the center of a mirror which deflects the beam toward the faceplate. An optical system always insures that the beam from the actual source is always directed to the center of the scanning mirror. The scanning mirror is carried by an assembly that rotates the mirror about two orthogonal axes to provide scanning and that translates the mirror along two orthogonal axes to provide movement of the center of the mirror in the source plane. The optical system includes a plurality of mirrors, bearing assemblies and a telescoping member.

This system has limitations which render it less than suitable for use in a production environment for cathode ray tubes. First, a scanning exposure system must have accurate optical alignment characteristics, i.e., the ability to repeatably position the light beam at a predetermined point on the faceplate. The machanical and optical system described is of such a complicated nature that it is doubtful that such alignment characteristics could be obtained. More specifically, the large number of rotating parts and simultaneously rotating and translating parts of the system could result in misalignment with continued use as is necessary in a production environment. Furthermore, the feature of actually translating the effective light beam source in a plane adds complexity to the electronic system which is necessary to control the scanning and mirror translation functions. More specifically, each time the mirror is translated, the beam, if not corrected by the scanning function, would impinge upon other than the desired faceplate location. Thus, the translating and scanning functions are interdependent.

SUMMARY OF THE INVENTION

An object of the present invention is to provide an optical scanning exposure system for use in the manufacture of color cathode ray tubes in which the scanning light beam undergoes substantially no translational motion at the faceplate when angle of incidence corrections are being generated.

Another object of the invention is the provision of a scanning exposure system capable of precise, repeatable alignment characteristics.

An additional object of the present invention is to provide a scanning exposure system which is capable of exposing the photosensitive material on the faceplate of a cathode ray tube in a time interval as low as a half minute so that the system speed is compatible with introduction into a CRT production assembly line.

In another object of the invention, the angle of incidence corrections and the beam scanning controls are not interdependent thereby reducing the complexity of the electronic control system for the optical scanning exposure system.

According to the present invention, there is provided an optical scanning apparatus for use in manufacturing cathode ray tubes. Such tubes include tubes in color television receivers, monitoring tubes and monoscopes in electrostatic printing devices. The apparatus exposes a layer of photosensitive material on an inner surface of a tube faceplate by scanning a light beam over an array of light-transmitting apertures in a mask disposed adjacent to the material on the faceplate. In the apparatus, a light source is provided for creating a light beam having a wavelength spectrum which exposes the photosensitive material. A device is disposed in the path of the light beam for deflecting the beam through an angle which is related to a predetermined angle of incidence that an electron beam has at each point on the aperture mask as it passes through the transparent regions of the mask in an operating cathode ray tube. Further, an optical device images the point of deflection of the light beam substantially onto the faceplate. Accordingly, the light beam may be made to impinge on the mask with the same angle of incidence as the electron beam in an operating tube. This proper angle of incidence is obtained substantially without translation of the light beam at the faceplate. Lastly, a device scans the deflected light beam over the aperture mask in a predetermined fashion to expose the photosensitive material adjacent to all light-transmitting regions on the mask. The beam deflecting device and the scanning device are adapted to operate in synchronism to provide the light beam with the proper angle of incidence for each light-transmitting region on the mask.

DESCRIPTION OF PREFERRED EMBODIMENTS

Figure 1:
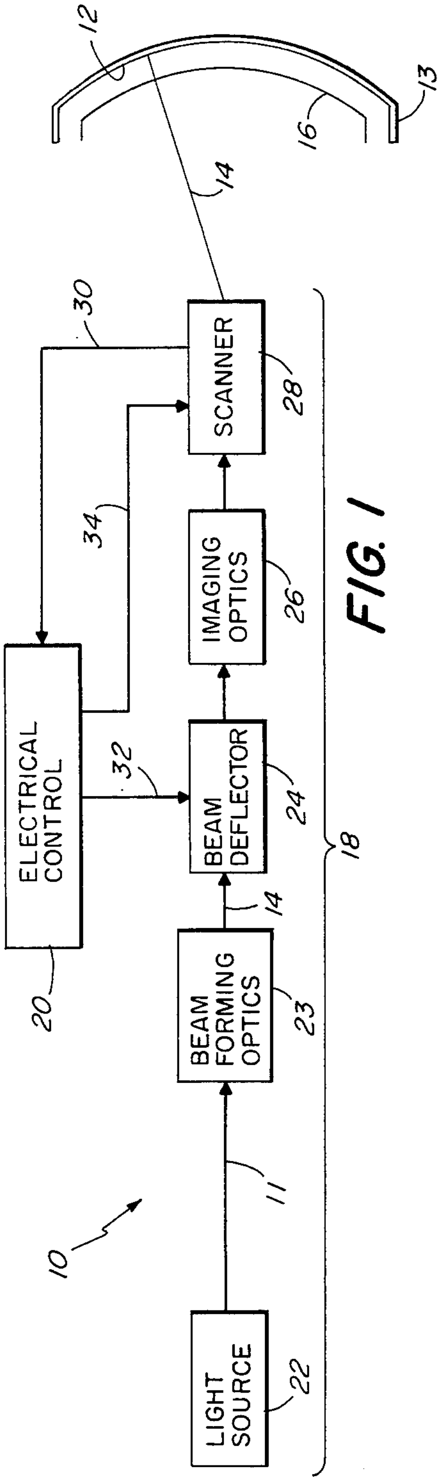
FIG. 1 is a block diagram of an optical scanning exposure system including an optical scanning apparatus according to the invention and an electrical control for the apparatus.

In an exemplary embodiment of the present invention, as illustrated in block diagram form in FIG. 1, an optical scanning exposure system, represented generally by the reference numeral 10, is utilized in the manufacture of color cathode ray tubes. The exposure system 10 exposes a layer of photosensitive material (not shown) on an inner surface 12 of a faceplate 13 for a cathode ray tube. The exposure is accomplished by scanning a light beam 14 over an array of light-transmitting apertures, in a mask 16 disposed adjacent to the faceplate. The exposure system 10 includes an optical scanning apparatus, represented generally by the reference numeral 18, and an electrical control system 20. The apparatus 18 includes the necessary mechanical and optical components which perform the actual scanning of the beam 14 on the faceplate 13, while the electrical control system 20 generates the command signals for the apparatus 18.

The optical scanning apparatus 18 includes a light source 22, beam forming optics 23, a beam deflector 24, an imaging optics assembly 26, and a scanner 28. The light source 22 emits light 11 which has a wavelength spectrum which exposes the photosensitive material. Preferably, the light source 22 is a laser light source. In the exemplary embodiment, the laser is an argon-ion laser. The beam forming optics 23 modifies light 11 from the source 22 to obtain the proper beam 14 diameter and divergence angle at the aperture mask 16. The beam deflector 24 is positioned in the path of the light beam and deflects the light beam through an angle which is related to a predetermined angle of incidence that an electron beam has at each point on the aperture mask as it passes through the transparent regions of the mask in an operating tube. The imaging optics 26 receives the deflected light beam 14 and images the point of deflection of the light beam substantially onto the faceplate 13. In this manner, the light beam 14 may be made to impinge on the mask with the same angle of incidence as the electron beam in an operating tube. By this arrangement, the proper angle of incidence is obtained substantially without translation of the light beam at the faceplate. The deflected light beam is scanned over the aperture mask in a predetermined fashion to expose the photosensitive material adjacent to all light-transmitting regions on the mask. The scanner 28 and the beam deflector 25 operate in synchronism via the electrical control 20 so that the light beam has the proper angle of incidence for each light-transmitting region on the mask. Before initiation of an exposure sequence, the electrical control 20 is provided with, and stores, predetermined information on the deflection which must be applied to the beam 14 to obtain the proper angle of incidence for each position on the aperture mask. Beam position information 30 fed from the scanner to the electrical control causes signals 32, generated from this stored information, to be applied to the beam deflector 24 in the correct sequence. This scan position information is also used by the electrical control in generating the scan signals 34.

Figure 2:
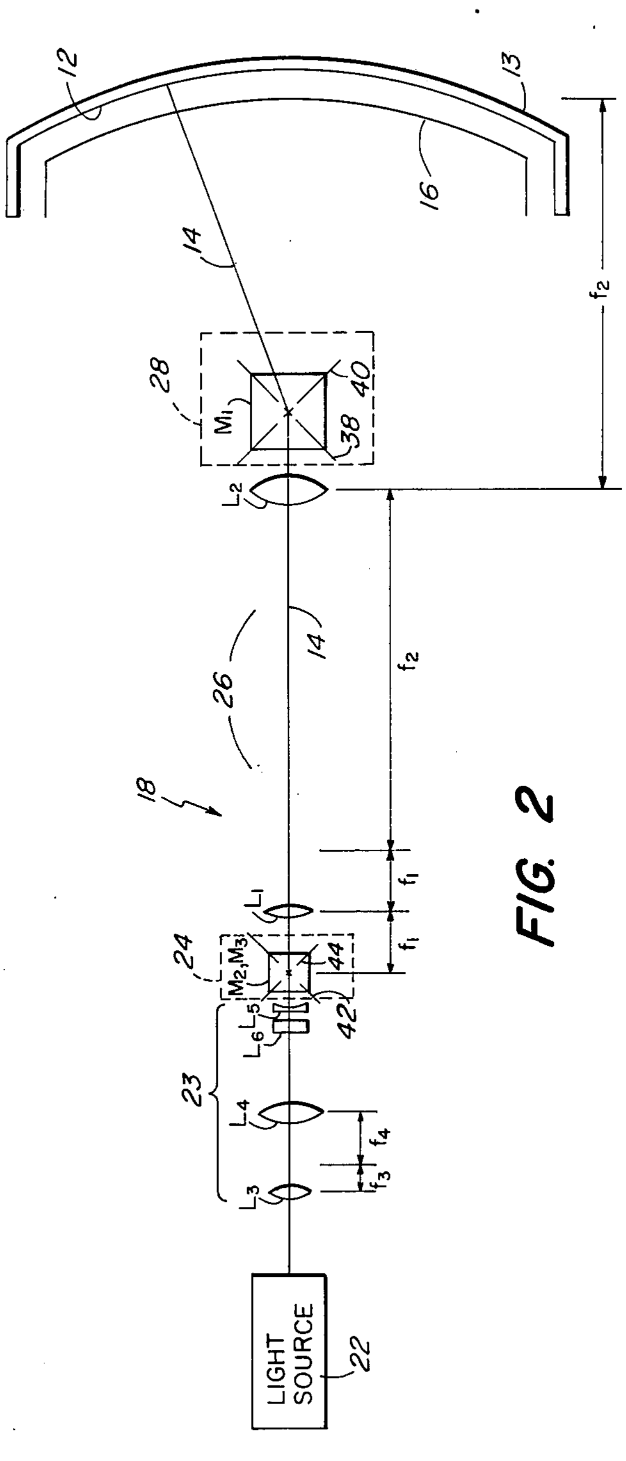
FIG. 2 is a diagram illustrating the various optical components of an embodiment of the optical scanning apparatus.

Referring now to FIG. 2, there is illustrated in detail a preferred embodiment of the various optical components comprising the optical scanning apparatus 18 shown in FIG. 1. The scanner 28 comprises a light reflecting surface, such as a mirror M1, which is rotatable about first and second scanning axes 38 and 40, which are orthogonal with respect to each other. The beam deflector 24 comprises a pair of rotatable mirrors M2 and M3. Each mirror is rotatable about one of a pair of orthogonal axes 42 and 44. While the beam deflector is shown as being a pair of mirrors, it is to be understood that the invention should not be limited since any combination of beam deflecting elements may be used so long as the required function is obtained. The imaging optics 26 includes first and second optical focusing elements L1 and L2 in the path of the deflected light beam 14. The focusing elements L1 and L2 are separated by a distance measured along the beam path equal to the sum of the focal lengths $f_1$ and $f_2$, respectively, of the focusing elements L1 and L2. Also, the first focusing element L1 is separated from the beam deflector 24 by a distance measured along the beam path equal to the focal length of $f_1$ of the first focusing element L1. The second focusing element L2 is separated from the faceplate by a distance measured along the beam path substantially equal to the focal length $f_2$ of the second focusing element L2. In the example of FIG. 2, both focusing elements L1 and L2 are double-convex converging lenses. However, it is to be understood that any combination of focusing elements, such as mirrors with either concave or convex surfaces or lenses with either concave or convex surfaces may be used so long as such combination of focusing elements images the deflected light beam onto the vicinity of the faceplate 13. Also, as illustrated in FIG. 2. $f_2$ is greater than $f_1$ to provide magnification of the cross-sectional area of the light beam. Preferably, the beam area at the mask is greater than the size of the apertures, thereby to simultaneously direct light through a plurality of apertures.

The optical scanning apparatus 18 may, although not necessary, include additional structural features which may advantageously be utilized. For example, it may be desirable that the beam from the light source 22 be well collimated or that its diameter be modified before entering the remainder of the optical system. In the preferred emboiments, the light source is a laser light source and to improve collimation of the beam or to change its diameter, it may be desirable to insert a telecentric lens system, such as lenses L3 and L4, in the path of the light beam 14 immediately as it leaves the light source 22. These lenses L3 and L4 are separated by substantially a distance equal to the sum of their focal lengths, $f_3$ and $f_4$, respectively; in the exemplary embodiment, the lenses are double-convex, converging lenses but it is to be understood that other combinations of focusing elements could also be used. Additionally, in the preferred embodiment, it may be desired to make the light beam appear to be originating from a point source as seen from the aperture mask. To accomplish this feature, a diverging lens L5 may be inserted into the path of the light beam 14 at a location to the left of the beam deflector 24. Lastly, it may be desirable with certain types of aperture masks, such as the slot aperture type, to obtain more beam divergence in one axis than in its orthogonal axis. This feature may be obtained by placing a lens L6 in the path of the light beam, the lens L6 being a cylindrical or toroidal diverging lens.

Figure 3:
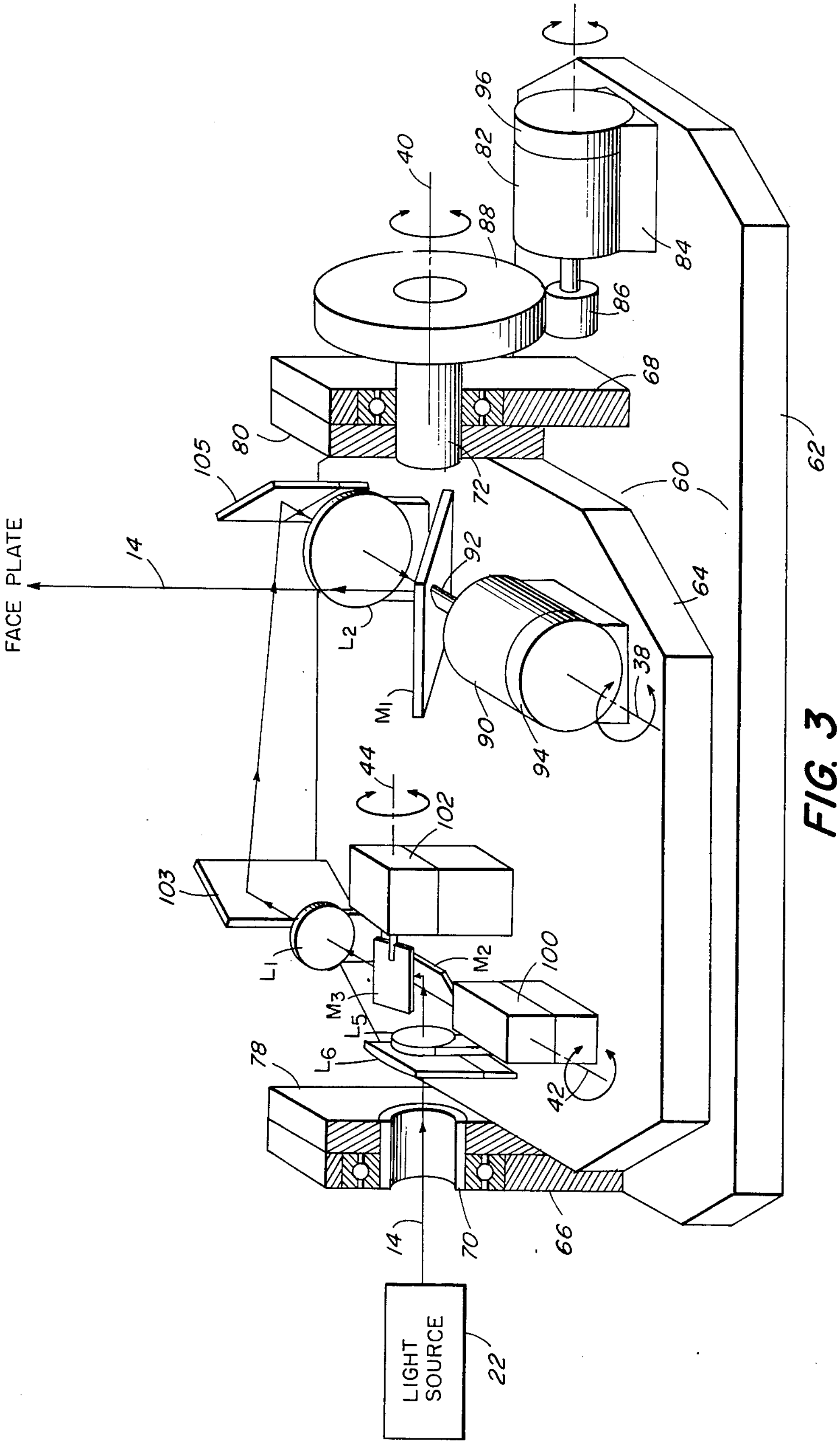
FIG. 3 is a perspective view of an illustrative embodiment of an optical scanning apparatus including both optical and mechanical components according to the present invention.

FIG. 3 is an illustrative embodiment of the combination of mechanical and optical components which comprise the optical scanning apparatus 18 previously mentioned with reference to FIGS. 1 and 2. The purpose of the mechanical components is to provide the means for implementing the rotating capability of the scanner 28 and the beam deflector 24. The scanner 28 includes the mirror M1 for steering the light beam 14 from the imaging optics 26 through a sequence of angles defined with respect to two intersecting scan axes 38 and 40, these axes being orthogonal with respect to each other. With respect to scanning about scan axis 40, the scanner includes a cradle assembly, represented by the reference numeral 60, having a base 62 and a component support platform 64 rotatably coupled to the base 62 and a drive assembly for rotating the support platform 64 with respect to the base 62. The scan axis 40 is the axis of rotation of the cradle assembly 60. In order that the beam position on the mirror M1, and thus the origin of scanning action in the scanner 28, remain invariant with respect to rotation about scan axis 40, it is important that the light beam 14 be coaxial with the scan axis 40 as the beam enters the cradle assembly. In rotatably coupling the support platform 64 to the base 62, a pair of cradle support flanges 66 and 68 are rigidly affixed to the base 62 on opposite sides of the platform 64. Flanges 66 and 68 have shafts 70 and 72, respectively, rotatably mounted thereon. The shaft 70 is formed with a central aperture, permitting the beam 14 to enter the cradle 60 along its axis. The shaft 70 is rigidly affixed to a support flange 78 which, in turn, is rigidly affixed to one side of the platform 64. Likewise, a support flange 80 is rigidly affixed to the other side of the platform 64 and to the shaft 72. The drive assembly for rotating the support platform 64 about the scan axis 40 includes a motor 82 affixed at 84 to the base 62 and a speed reduction mechanism, illustrated here as a gear train, comprising gears 86 and 88, coupling the output of the motor 82 to the shaft 72. One advantage of the speed reduction mechanism is in reducing the inertia load on the motor. This load is caused by the necessity of rotating not only the platform 64, but also all the components which are mounted on the platform. The speed reduction mechanism also allows finer control of the platform by the motor.

The type of motor 82 which is employed depends upon the nature of the scanning sequence. In the exemplary embodiment, the scanning sequence is similar to that of an electron beam in an operating cathode ray tube displaying a NTSC-type television signal. In both situations, the sequence comprises a vertically descending series of horizontal scan lines. The difference is that the electrom beam scan is interlaced and is unidirectional from left to right as viewed from the outer surface of the faceplate, whereas the light beam scan is not interlaced and is bidirectional. In this type of light beam scan sequence, the line scan velocity is greater than the average scan velocity orthogonal to the lines, i.e., the frame scan velocity. Accordingly, the scan axis 40 of the cradle controls the frame scanning, and it has been found to be advantageous to use a stepper motor for the motor 82. Thus, a raster is generated as the line scanner, described below, sweeps the laser light beam back and forth across the aperture mask in a zig-zag motion, and the frame scan cradle steps down some fraction of a line at the end of each line. Other types of scan patterns may be utilized; for example, the pattern may be spiral and in such case, a continuous motion motor, such as a dc servo motor, may be more desirable for the motor 82.

As previously stated, the scanner 28 also includes a device for steering the light beam from the imaging optics 26 through a sequence of angles about the line scan axis 38. In FIG. 3, this device includes the mirror M1 and a motor 90 whose output shaft 92 is rigidly affixed to the mirror M1. Preferably, the motor 90 is a dc servo motor. There are several features of the mirror M1. First, the intersection point of the scan axes 38 and 40 is at the mirror reflecting surface so that the origin of scan for both axes is coincident. Further, the reflecting planar surface of the mirror M1 is at an angle of 45° with respect to the scan axis 38.

The dc servo motor 90 and the stepper motor include angular shaft encoders 94 and 96, respectively, for providing a scan position signal which is sent to the electrical control 20 via the line 30 as previously shown in FIG. 1. Also, each motor receives a command signal from the electrical control 20; these signals are shown as being carried over the line 34 in FIG. 1.

The beam deflector 24 in FIG.s 1 and 2 is shown on FIG. 3 as mirrors M2 and M3 and their associated rotational drive mechanisms 100 and 102. The rotational axes 42 and 44 of the mirrors M2 and M3, respectively, are orthogonal and closely spaced to bring the origin of beam deflection for each axis in near coincidence. This feature of bringing the origin of beam deflection in near coincidence could also be accomplished without actually physically mounting the mirrors close to one another. For example, if desirable, the mirrors could be spaced apart and a focusing element, such as a lens, could be used to focus one mirror deflection point onto the other mirror. The mirrors M2 and M3 are rotated by galvanometer-type motors 100 and 102, respectively; these galvanometers, as is well known, provide an angular rotation of the output shaft proportional to a current input. The galvanometers in the example should provide an output shaft rotation in the range of $\pm 15°$.

Figure 4A:
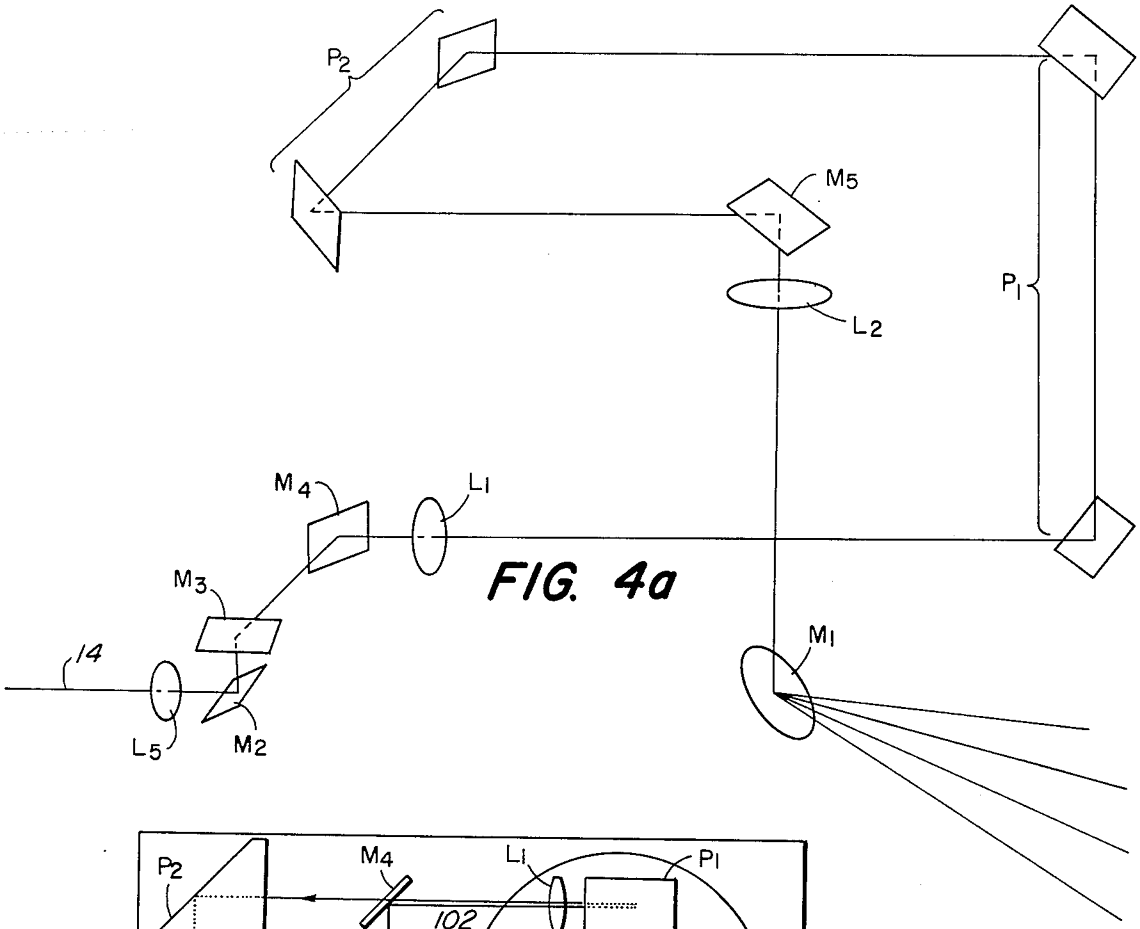
FIG. 4*a* is a perspective view of the optical path in a preferred embodiment of an optical scanning apparatus according to the invention.
Figure 4B:
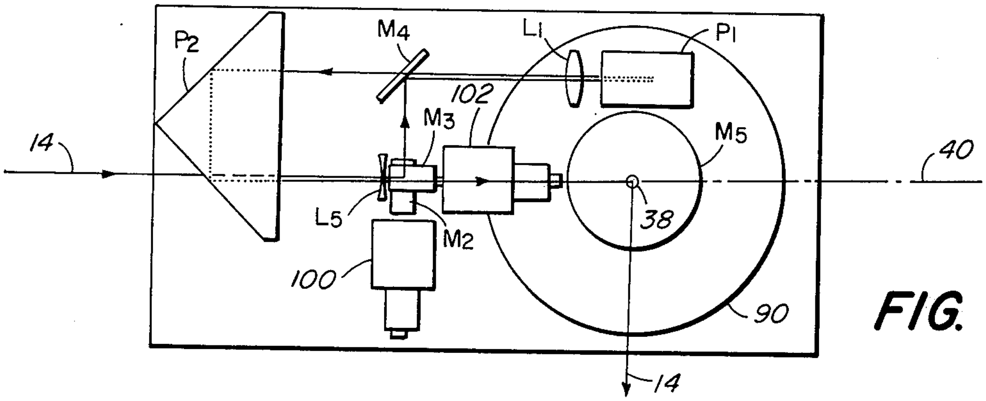
FIG. 4*b* is a plan view of the embodiment shown in FIG. 4*a* showing the disposition of mechanical components.
Figure 4C:
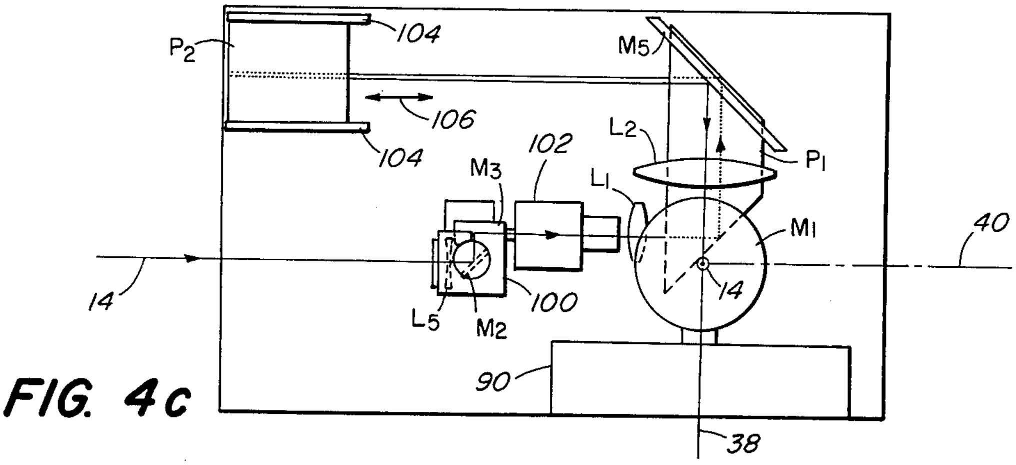
FIG. 4*c* is a side elevational view of the embodiment shown in FIG. 4*a* showing the disposition of mechanical components.

While many arrangements of the basic optical components of the scanning apparatus 18 are possible within the spirit and scope of the invention, a particularly compact and convenient embodiment is shown in FIGS. 4*a*, 4*b*, and 4*c*, representing perspective, top and side views, respectively. In this embodiment, the light path is folded by mirrors M4 and M5 and right angle prisms P1 and P2. An advantage of prisms for folding the optical path is that beam deviation is produced by total internal reflection at the glass-air interface rather than from a specially coated surface, as in standard mirrors. Reflection efficiency can be nearly 100% and is not subject to deterioration as readily as standard mirror surfaces.

As can be observed, the light beam passes through or is reflected from the following components in sequence:

diverging lens L5
rotatable deflection mirror M2
rotatable deflection mirror M3
fixed mirror M4 (90° deviation)
focusing lens L1
prism P1
prism P2
fixed mirror M5
focusing lens L2
scan mirror M1

This embodiment may be easily adapted to use with faceplates for different size cathode ray tubes by changing the focal length of lens L2 and re-establishing the distance between lens L1 and lens L2 at $f_1$ plus $f_2$ by moving prism P2 along a track assembly 104 in the direction of arrow 106. The focal length $f_2$ of lens L2 is chosen such that the center of rotation of the scan mirror M1 is located in a position with respect to the faceplate substantially equivalent to the position of the origin of electron beam deflection in an operating CRT when the faceplate is at a distance substantially $f_2$ from lens L2.

The details of the electrical control 20, shown in FIG. 1, do not comprise a part of the present invention. As stated previously, the function of the control is to generate the scan control signals while at the same time to supply the proper current values to the galvanometers at each scan position. This function can be obtained by numerous types of apparatus depending upon the degree of automation desired. In an unautomated case, the control for each galvanometer may merely be a variable current source, and the control for the scanning motors may be a suitable, indexable electrical power source. In operation, the scan motors are indexed to the proper scan position, and then the motors are stopped; for each position, the variable current sources are adjusted for the proper values. Then, the laser is turned on and after exposure, the laser is turned off. This operation is repeated in sequence until the faceplate is exposed. For more automated operation, a properly programmed, general purpose computer may be used as the electrical control. The computer stores the angle of incidence adjustments (i.e., the values of current for each scan position) in a memory and outputs the proper current values and scan position signals.

One of two techniques may be used for establishing the proper angle of incidence adjustments for each scan position. The first is an empirical process requiring the exposure of a sample faceplate by another system such as that utilizing the aspheric lens and graded neutral density filter. The exposed sample faceplate is then mounted into position in the scanning apparatus of the present invention. The scanning mirrors are then indexed to the various scan positions, and at each scan position, the proper amount of current is applied to the galvanometers so that the light beam landing is coincident with the exposed material. These current values comprise the angle of incidence adjustments for processing other faceplates of the same type as the sample. In another method, it is possible to derive an equation relating the current to the galvanometers to the scan mirror angular position. The equation relating current to scan mirror angle is a function of the geometry of the optical scanning apparatus 18 and of a set of data which defines the effective position ($X_p$, $Y_p$) of the electron beam in a deflection plane for each faceplate location (X, Y, Z). This equation may be implemented by a suitable programmed, general purpose computer or by a special purpose computer forming the electrical control 20.

Preferably, the electrical control 20 is implemented in the manner described in the concurrently filed patent application entitled "Control System For An Optical Scanning Exposure System For Manufacturing Cathode Ray Tubes" bearing Attorney's Docket No. D-8561 and being filed in the name of Thomas W. Schultz. In this control system, there is provided a memory storage device for storing information representative of the proper angle of incidence of a light beam at a matrix of positional locations on the faceplate of the cathode ray tube and of the rate of scan of the light beam from one positional location to the next. The encoder provides horizontal and vertical light beam scan position information to the storage device. A scan rate device, responsive to the scan rate and position information in the memory storage provides signals for controlling the rate of light beam scanning. Further, an angle of incidence control device, responsive to angle of incidence and position information from the memory storage, provides electrical signals for the galvanometers which control the angle of incidence deflecting mirrors.

The embodiments of the present invention are intended to be merely exemplary and those skilled in the art shall be able to make numerous variations and modifications of them without departing from the spirit and scope of the present invention. For example, it is not necessary that the scan function and the imaging function be separate components; for example, a rotatable, curved reflective surface may serve the same functions of the focusing element $f_2$ and the scan mirror M1. Also, it is possible to have continuous unidirectional rotation about the scan axis 38 instead of bidirectional rotation. All such variations and modifications are intended to be within the scope of the present invention as defined by the appended claims.

I claim:

1. An optical scanning apparatus for use in manufacturing cathode ray tubes wherein a layer of a photosensitive material on the inner surface of a tube faceplate is exposed by scanning a light beam over an array of light-transmitting apertures in a mask disposed adjacent to the layer of material on the faceplate, the apparatus including:
   a. a light source for creating a light beam having a wavelength spectrum which exposes the photosensitive material,
   b. means disposed in the path of the light beam for deflecting the light beam through an angle which is related to a predetermined angle of incidence that an electron beam has at each point on the aperture mask as it passes through the transparent regions of the mask in an operating tube,
   c. optical means, operating on the deflected light beam, for imaging the point of deflection of the light beam substantially at the faceplate so that the light beam may be made to impinge on the mask with an angle of incidence related to that of an electron beam in an operating tube, the angle of incidence being obtained substantially without translation of the light beam at the faceplate, and
   d. means for scanning the deflected light beam over the aperture mask in a predetermined fashion to expose the photosensitive material adjacent to all light-transmitting regions on the mask, the deflecting means being operative in synchronism with the scanning means to provide the light beam with the proper angle of incidence for each light-transmitting region on the mask.

2. The apparatus according to claim 1 wherein the imaging means includes first and second optical focusing elements in the path of the deflected light beam, the focusing elements being optically separated by a distance measured along the beam path equal to the sum of the focal lengths of the focusing elements, the first focusing element being separated from the deflecting means by a distance measured along the beam path equal to the focal length of the first focusing element, the second focusing element being separated from the faceplate by a distance measured along the beam path substantially equal to the focal length of the second focusing element.

3. The apparatus according to claim 2 wherein at least one focusing element is a lens.

4. The apparatus according to claim 3 wherein the second focusing element is a converging lens.

5. The apparatus according to claim 4 wherein the first focusing element is a converging lens.

6. The apparatus according to claim 5 wherein each converging lens is a double-convex lens.

7. The apparatus according to claim 2 wherein the cross-sectional area of the light beam at the mask is such as to simultaneously direct light through a plurality of light-transmitting regions.

8. The apparatus according to claim 2 further including beam folding means disposed in the optical path between the first and second focusing elements for reducing the actual distance between the focusing elements.

9. The apparatus according to claim 8 further including means for varying the length of the optical path between the focusing elements to compensate for the use of focusing elements of varying focal lengths.

10. The apparatus according to claim 8 wherein the beam folding means includes at least one prism for deflecting the beam through substantially 180°, the prism providing total internal reflection.

11. The apparatus according to claim 9 wherein the beam folding means includes a pair of prisms in cooperative relationship for deflecting the beam, both of the prisms providing total internal reflection, and wherein the length varying means includes one of the prisms including alignment track means for adjusting the position of the prism along a straight line.

12. The apparatus according to claim 8 wherein the beam folding means includes a pair of mirrors in cooperative relationship for deflecting the beam through substantially 180°.

13. The apparatus according to claim 1 wherein the deflecting means deflects the light beam through an angle which is proportional to the angular difference between the angle of incidence of an electron beam in an operating tube at a defined location on the faceplate and the angle of incidence of the light beam on the same defined location on the faceplate without the effect of the deflection means.

14. The apparatus according to claim 13 wherein the deflecting means includes first and second rotatable light reflecting elements, each element having an axis of rotation along its respective planar surface, the axes of rotation being orthogonal with respect to each other, the elements being separated by a distance not greater than that necessary for rotating the elements without the elements contacting each other.

15. The apparatus according to claim 14 further including first means for rotating the first deflecting element and second means for rotating the second deflecting element.

16. The apparatus according to claim 15 wherein each of the first and second rotating means includes a galvanometer.

17. The apparatus according to claim 16 wherein each galvanometer shaft rotates approximately ±15°.

18. The apparatus according to claim 14 wherein each of the first and second deflecting elements is a mirror.

19. The apparatus according to claim 18 wherein the axis of rotation of the first mirror substantially intersects and is normal to the light beam from the source and the surface of the first mirror is at a nominal angle with respect to the beam from the source of approximately 45°, and wherein the axis of rotation of the second mirror is parallel to the light beam from the source and the surface of the second mirror is at a nominal angle of the beam reflected from the first mirror of approximately 45° so that the mirrors nominally change the direction of the beam from the source by an angle equal to 90°.

20. The apparatus according to claim 1 wherein the scanning means includes:

a. means for steering the light beam from the imaging means through a sequence of angles defined with respect to a first scan axis.

b. means for steering the light beam from the imaging means through a sequence of angles defined with respect to a second scan axis, and c. the scan axis being orthogonal with respect to each other.

21. The apparatus according to claim 20 wherein the second scan axis steering means includes:

a. a cradle assembly having a base and a support platform rotatably coupled to the base such that the support platform may rotate about the second scan axis, the support platform having mounted thereon at least the means for steering about the first scan axis, the light beam entering the cradle assembly being coaxial with the second scan axis, and b. means for rotating the support platform about the second scan axis.

22. The apparatus according to claim 21 wherein the light beam steering about the first scan axis produces a line scan motion of the light beam on the faceplate and wherein the light beam steering about the second scan axis produces a scan motion which is perpendicular to the line scan motion.

23. The apparatus according to claim 21 further including encoder means for generating a signal representative of the scan angle about the second scan axis.

24. The apparatus according to claim 21 wherein the rotating means includes a motor whose output is coupled to the support platform.

25. The apparatus according to claim 24 further including speed reduction means disposed between the support platform and the motor output for reducing the inertia load on the motor and for reducing the rotational speed of the support platform.

26. The apparatus according to claim 25 wherein the motor is a stepper motor adapted to index the light beam in a sequence of discrete positions with respect to the faceplate.

27. The apparatus according to claim 21 wherein the first scan axis steering means includes:

a. a scanning mirror positioned with respect to the support platform such that the second scan axis intersects the first scan axis at the reflecting surface of the mirror, the light beam from the imaging means further nominally impinging the scanning mirror at this intersection point, and b. means for rotating the scanning mirror about the first scan axis.

28. The apparatus according to claim 27 further including encoder means for generating a signal representative of the angular position of the scanning mirror about the first scan axis.

29. The apparatus according to claim 27 wherein the rotating means includes a motor whose output shaft is rigidly affixed to the scanning mirror at a side opposite to the reflecting surface.

30. The apparatus according to claim 29 wherein the motor is a dc servo motor.

31. The apparatus according to claim 29 wherein the scanning mirror is positioned at an angle with respect to the first scan axis and with respect to the nominal light beam from the imaging means of 45° so that the nominal path of the light beam from the scanning mirror is 90° with respect to both the first and second scan axes.

32. The apparatus according to claim 1 wherein the light source is a laser light source producing a light beam capable of being efficiently collimated.

33. The apparatus according to claim 32 wherein the laser light source is an argon-ion laser.

34. The apparatus according to claim 33 further including means for collimating the light output of the laser light source to produce a beam of parallel rays.

35. The apparatus according to claim 34 wherein the collimating means includes a pair of converging lenses in the path of the beam from the source, the lenses being separated by a distance substantially equal to the sum of their focal lengths.

36. An optical scanning apparatus for use in manufacturing cathode ray tubes wherein the photosensitive material on a faceplate is exposed by light directed through an array of light-transmitting regions in a mask including:

a. a laser light source for creating a laser light beam having a wavelength spectrum which exposes the photosensitive material, b. means disposed in the path of the light beam for deflecting the light beam through an angle which is related to a predetermined angle of incidence that an electron beam has with the faceplate in an operating tube, c. means for imaging the point of deflection of the light beam substantially at the faceplate, the imaging means including:

1. a first focusing element separated from the deflecting means by a distance measured along the light beam equal to the focal length of the first focusing element, and 2. a second focusing element being separated from the first focusing element by a distance measured along the light beam equal to the sum of the focal lengths of both first and second focusing elements, and being separated from the faceplate by a distance measured along the light beam substantially equal to the focal length of the second focusing element, d. beam folding means for reducing the actual separation between the focusing elements, and e. means disposed between the faceplate and the second focusing element for scanning the deflected light beam over the faceplate in a sequence of indexed lines to expose the photosensitive material adjacent to the light-transmitting regions on the mask.

37. A method of manufacturing cathode ray tubes wherein a layer of a photosensitive material on the inner surface of a tube faceplate is exposed by scanning a light beam over an array of light-transmitting apertures in a mask disposed adjacent to the layer of material on the faceplate, the method including the steps of:

a. generating a light beam having a wavelength spectrum which exposes the photosensitive material,
b. deflecting the light beam through an angle which is related to a predetermined angle of incidence that an electron beam has at each point on the aperture mask as it passes through the transparent regions of the mask in an operating cathode ray tube,
c. imaging the point of deflection of the light beam substantially at the faceplate so that the light beam may be made to impinge on the mask with an angle of incidence related to that of an electron beam in an operating tube, the angle of incidence being obtained substantially without translation of the light beam at the faceplate, and
d. scanning the deflected light beam over the aperture mask in a predetermined fashion to expose the photosensitive material adjacent to all light-transmitting regions on the mask, the deflecting and scanning steps being synchronous so that the light beam has the proper angle of incidence for each light-transmitting region on the mask.

38. The method according to claim 37 wherein the steps of scanning the light beam include scanning the light beam in an indexed sequence of lines across the faceplate.

39. The method according to claim 37 further including the step of collimating the light beam prior to deflecting the light beam.

40. The method according to claim 37 wherein the step of deflecting the light beam includes deflecting the beam with respect to a pair of orthogonal axes so as to define any deflection angle with respect to a plane normal to the non-deflected light beam.

41. The method according to claim 37 wherein the step of imaging the point of deflection of the beam includes the step of folding the beam so as to reduce the straight-line separation between the locations of the beam deflection step and the beam scanning step.

* * * * *